United States Patent
Ranganathan

Patent Number: 5,754,170
Date of Patent: May 19, 1998

[54] TRANSPARENT BLOCKING OF CRT REFRESH FETCHES DURING VIDEO OVERLAY USING DUMMY FETCHES

[75] Inventor: Ravi Ranganathan, Cupertino, Calif.

[73] Assignee: NeoMagic Corp., Santa Clara, Calif.

[21] Appl. No.: 586,583

[22] Filed: Jan. 16, 1996

[51] Int. Cl.$^6$ .................................................. G09G 5/00
[52] U.S. Cl. ........................... 345/185; 345/112; 395/507
[58] Field of Search ...................................... 345/112, 113, 345/114, 115, 118, 132, 133, 185, 189, 201; 395/501, 521, 507, 508

[56] References Cited

U.S. PATENT DOCUMENTS

| | | | |
|---|---|---|---|
| 4,710,761 | 12/1987 | Kapur | 345/201 |
| 5,146,211 | 9/1992 | Adams et al. | 345/145 |
| 5,146,592 | 9/1992 | Pfeiffer et al. | 395/344 |
| 5,179,639 | 1/1993 | Taaffe | 395/128 |
| 5,208,583 | 5/1993 | Cusick et al. | 345/28 |
| 5,208,745 | 5/1993 | Quentin et al. | 364/188 |
| 5,216,413 | 6/1993 | Seiler et al. | 345/120 |
| 5,233,686 | 8/1993 | Rickenbach et al. | 395/344 |
| 5,264,837 | 11/1993 | Buehler | 345/115 |
| 5,276,437 | 1/1994 | Horvath et al. | 345/119 |
| 5,293,540 | 3/1994 | Trani et al. | 348/584 |
| 5,319,382 | 6/1994 | Fitzpatrick et al. | 345/118 |
| 5,345,554 | 9/1994 | Lippincott et al. | 395/509 |
| 5,375,203 | 12/1994 | Lambidakis | 395/511 |
| 5,398,075 | 3/1995 | Ferytag et al. | 348/590 |
| 5,404,437 | 4/1995 | Nguyen | 395/806 |
| 5,432,905 | 7/1995 | Hsieh et al. | 345/99 |
| 5,608,864 | 3/1997 | Bindlish et al. | 345/185 |

FOREIGN PATENT DOCUMENTS 95302220  11/1995  WIPO .

Primary Examiner—Xiao Wu
Assistant Examiner—Xu-Ming Wu
Attorney, Agent, or Firm—Stuart T. Auvinen

[57] ABSTRACT

A graphics controller overlays a movie window over the graphics pixel data. Movie pixels are from a movie source and are muxed into the pixel path by a pixel mux near the end of the graphics pipeline. A comparison of the current pixel count to the pixel address of the start and ending boundaries of the movie window controls the pixel mux, which selects either graphics pixels or movie pixels for display to a screen. Since the graphics controller is pipelined, the pixel compare near the end of the pipeline does not restart the graphics pipeline early enough for it to pre-process the graphics pixels. The graphics pipeline does not stop during the movie window but instead performs dummy fetches from the graphics memory to a CRT FIFO in the graphics pipeline. Dummy fetches are fetches of graphics pixels that are not displayed. Since these fetches contain non-displayed pixels, they are not needed except to keep the fetch count counting even during the movie window. Other requests are given priority during dummy fetches. Thus fetches to fill the CRT FIFO with pixels underneath the movie overlay which are not displayed are transparently blocked by activating dummy fetches, allowing other requestors to have full access to the graphics memory. Dummy fetches are activated by a compare of the fetch counts to the width of the graphics and movie portions of the screen, expressed in memory fetches rather than in pixels. A comparison of the total fetches in a horizontal line to the current fetch count prevents fetching un-displayed pixels past the end of the line.

24 Claims, 9 Drawing Sheets

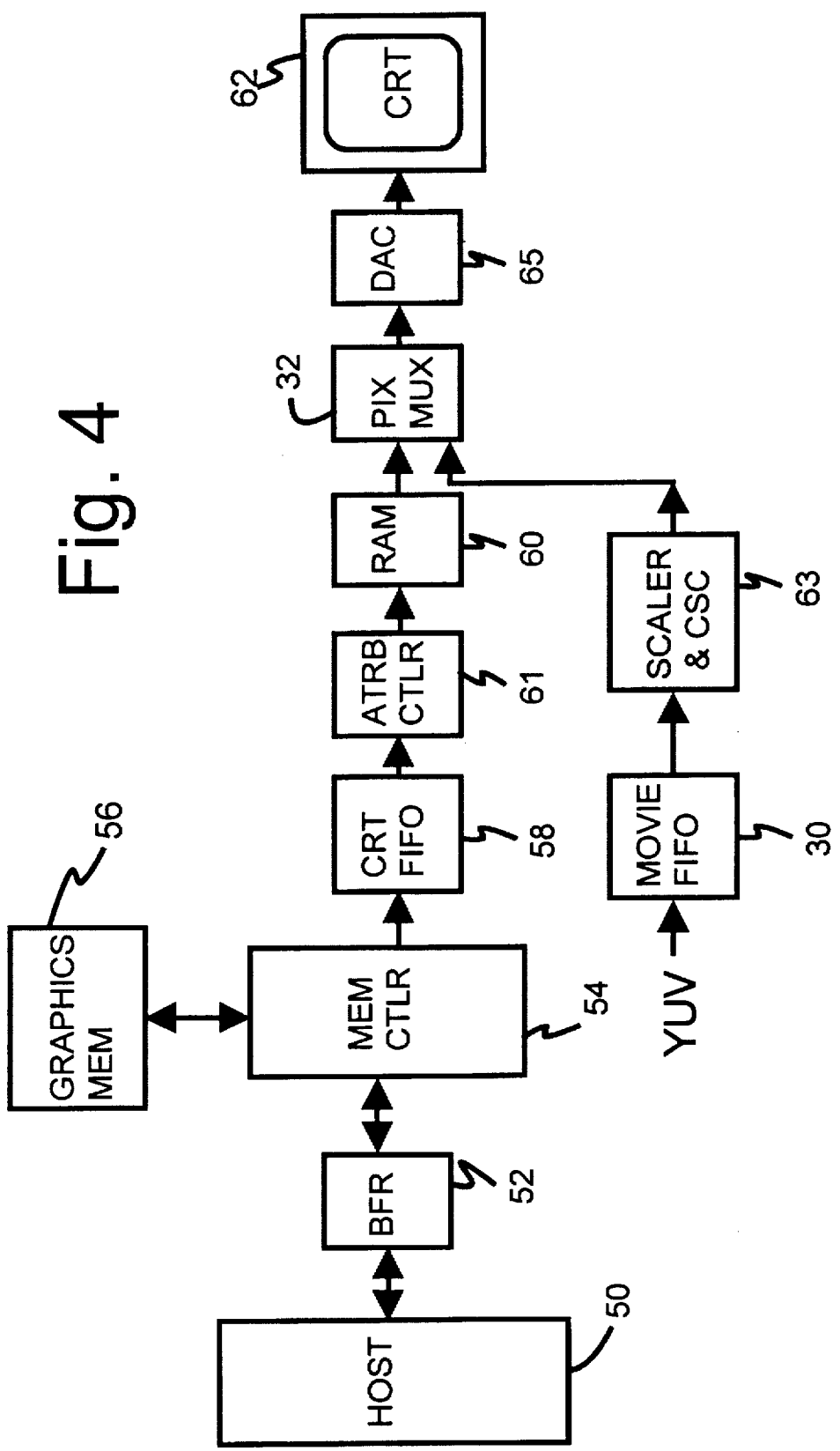

TRANSPARENT BLOCKING OF CRT REFRESH FETCHES DURING VIDEO OVERLAY USING DUMMY FETCHES

BACKGROUND OF THE INVENTION—FIELD OF THE INVENTION

This invention relates to video graphics systems, and more particularly to overlaying full-motion-video frames onto a graphics screen.

BACKGROUND OF THE INVENTION—DESCRIPTION OF THE RELATED ART

Graphics display subsystems have increased in performance and flexibility. The graphics image of the screen is built up pixel-by pixel under program control. These pixels are often in color, using a red-green-blue (RGB) color-space coding for the graphics pixels.

Full-motion video images may now be partially or fully superimposed over the graphics image. Rather than being strictly computer-generated, like the graphics data, the video overlay, herein referred to as movie overlay, can come from a real-time video source such as a television receiver or video camera, or perhaps from a video playback device such as a CD-ROM. The video overlay image is typically in the YUV color-space encoding rather than RGB. Thus the video overlay is not directly compatible with the graphics image. The video overlay pixels are normally converted to RGB and then muxed into the pixel stream just before being output to the display monitor.

FIG. 1 is a diagram of a display, which could be a cathode-ray-tube (CRT) video display, or a flat-panel liquid-crystal display (LCD) or other type of display. A graphics image is formed on the display screen by selectively energizing or illuminating small dots or pixels on the screen. In a CRT, a pixel is energized by an electron gun that directs a beam of energizing electrons to a particular point on the screen. The electron beam is scanned from left to right in a horizontal line and pulsed to illuminate some points on the line but not others. The screen is divided into a number of horizontal lines 10, 12, 16, with each line comprising a number of pixels. The pixels in a line are illuminated one-by-one from the left side to the right side of a horizontal lines 10, 12, 16.

Once the entire horizontal line 10, 12, 16 has been scanned, the electron beam is disabled or "blanked" so that no pixels are energized and the electron beam is re-traced back to the beginning on the next horizontal line 12. This horizontal re-trace 14 follows a diagonal path. After re-trace, the blanking is ended and the next horizontal line 12 is scanned. The process of scanning a horizontal line and re-tracing is repeated until all lines are scanned. Once scanning of the last horizontal line 16 is complete, the electron beam is returned to the beginning of the first line 10 by a vertical re-trace 18. The electron beam is again blanked to prevent any illumination while the electron beam is being retraced to the top of the screen.

Other display technologies also divide a screen into horizontal lines comprised of pixels that are either illuminated or not. A horizontal recovery or blanking period between horizontal lines and a vertical recovery or blanking period to return to the top of the screen may also be necessary with these display technologies, even though an electron beam is not used.

FIG. 2 shows a screen of graphics data overlaid with a movie window. Each horizontal line of pixels contains Hn pixels. VGA 640×480 resolution has 480 lines of 640 pixels per line. Movie window 20 is overlaid on 'top' of the graphics screen data so that the graphics data underneath movie window 20 is not visible. Movie window 20 is also known as a movie envelope, and the coordinates (in pixels) of the upper left corner of movie window 20 (X1,Y1) and the lower right corner (X2,Y2) define the size and location within the graphics screen. A horizontal scan line 22 which passes through movie window 20 has three regions:

1. 1ST GPX region from pixel 1 to pixel X1−1 contains graphics data;
2. MOVIE region from pixel X1 to pixel X2 contains full-motion-video data;
3. 2ND GPX region from pixel X2+1 to end of line, pixel Hn, contains graphics data. Only horizontal scan lines between lines Y1 and Y2 have these three regions and require special processing; other lines contain only graphics data and no movie data.

A pixel mux will select movie overlay pixels during the movie window but select graphics pixels during the first and second graphics regions, and for lines entirely outside of the movie window. This pixel mux is controlled by a simple comparison of the current pixel passing through the pixel mux with X1 and X2. When the pixel is between X1 and X2, then the movie window is being displayed, and the movie pixels are selected. Otherwise the graphics pixels are selected. See for example, U.S. Pat. No. 5,404,437, and U.S. Pat. No. 5,293,540.

All modern graphics controllers are highly pipelined which greatly complicates the muxing of movie or graphics pixels. For example, pixels are normally stored in a large DRAM or VRAM memory, and groups of pixels are fetched and written to a CRT FIFO. The pixels are individually read from the CRT FIFO and pass through other stages, such as attribute and color mapping before being converted to analog voltages by a digital-to-analog converter (DAC). The pixel muxing of movie and graphics pixels occurs late in this pipeline, such as just before the DAC. At the end of the movie window, as pixel X2 is passing through the pixel mux near the DAC, the next pixel must come from the graphics path. However, the CRT FIFO is several pipeline stages upstream from the pixel mux. The CRT FIFO must be re-loaded several clocks before pixel X2 is detected at the pixel mux.

Since the CRT FIFO must be reloaded and re-started for the 2ND GPX region several clock cycles before pixel X2 is detected at the pixel mux, another comparison must be done upstream from the pixel mux. Since the CRT FIFO is loaded with groups of pixels in each memory fetch, rather than one pixel at a time, the compare must be performed on fetches rather than pixels. Thus X2 must be reduced by some number of pixels to allow the CRT FIFO to restart before the graphics pixels after pixel X2 are required. Then the reduced X2 must be converted to memory fetches rather than raw pixels.

Graphics controllers may use additional registers to define fetching for a movie window. A controller may require that a CRT FIFO re-start address be programmed into a register. The programmer first determines the size of the movie window (MVW), then converts pixels to memory fetches, and finally half of the width of the movie window is programmed into the register as an offset address. For example, a 320-bit-wide movie window with a color mode requiring 4 bits per pixel, and using a graphics memory that reads 32 bits per fetch reads 32 bits/access×pixel/4 bits=8 pixels/access. The movie window is 320 pixels/(8 pixels/ access)=40 memory accesses wide. Half or 40 accesses is 20 accesses. The offset address 20 is thus programmed into the register.

When the start of the movie window is detected at the pixel mux at pixel X1, the CRT FIFO is flushed of all remaining graphics pixels. These flushed pixels are graphics pixels for the area underneath the movie window which are not displayed. Indeed, these pixels that are flushed did not have to be fetched at all, and just waste bandwidth of the DRAM graphics memory. Once the CRT FIFO is flushed, the re-start offset address from the register is added to the CRT FIFO's read counter, and the memory fetches resume starting with re-start address, which is somewhere in the second half of the movie window. The CRT FIFO continues to fetch pixels from the graphics memory until the CRT FIFO becomes full. Then pixels are read out of the CRT FIFO near the end of the movie window. Some synchronization is needed to ensure that the first graphics pixel after X2 arrives at the pixel mux at the proper time.

Again, some number of pixels before the end of the movie window are fetched into the CRT FIFO before the end of the movie window. Many of these pixels are not displayed, but are underneath the movie window. Thus more un-displayed pixels are fetched, wasting memory bandwidth.

FIG. 3 shows that in addition to video boundary registers for pixels, a re-start register is needed to restart a pipelined graphics controller at the proper time. An x,y coordinate system is used to locate any pixel or boundary on the screen. Registers 24, 26 contain binary numbers representing the numbers X1 and X2, which define the boundaries between the video overlay and surrounding graphics regions in a horizontal line. Registers 28, 29 contains the line number for the upper and lower line in the movie window relative to the graphics lines on the screen. Re-start register 39 contains an offset address within the movie window where the CRT FIFO should begin fetching from graphics memory. As shown on FIG. 2, this re-start address is in the second half of movie window 20, but before the end of movie window 20. This re-start address allows the graphics pipeline to be restarted early so that no gap occurs at the end of movie window 20.

Another approach is to define a coarse window or envelope. The coarse window is defined around the true movie window to allow fetching of movie pixels to begin earlier than the true movie window. This method defines a coarse X1, Y1 and X2, Y2 which are compared to the graphics pixel count. Thus a pixel-based compare of the coarse window is used to start and stop fetches early. The approach avoids fetching unnecessary graphics data and improves the available memory bandwidth.

The prior art suffers from unnecessary fetches from graphics memory to fill the CRT FIFO with pixels underneath the movie window that are not displayed. These unnecessary fetches occur before the CRT FIFO is flushed and once it is restarted. Further fetching may continue beyond the end of the line, and the CRT FIFO is normally flushed again at the end of each horizontal line, even when no movie window is present. Again these unnecessary fetches waste graphics memory bandwidth. This bandwidth is critical as graphics pixel depth and refresh rate increase. The re-start offset address scheme is complex to understand and program and require extra registers and hardware which increase silicon area and cost. Additionally these registers may have to be loaded only at specific times, such as during vertical retrace, or pipelined to prevent register updates in the middle of a line, which could cause tearing of the image displayed on the screen.

What is desired is a pipelined graphics controller that can efficiently overlay a full-motion-video image. It is desired to maximize bandwidth available to other devices such as writes from the host or a BLT engine or from the movie FIFO fill request. It is desired to reduce or eliminate unnecessary fetches of pixels that are not displayed on the screen, but are underneath the movie window or beyond the end of the line. It is also desired to eliminate extra registers to save die area and cost. It is desired to achieve these goals in a manner transparent to software.

SUMMARY OF THE INVENTION

A pipelined graphics controller overlays a movie window over a graphics screen. The pipelined graphics controller has a pixel mux which selects graphics pixels or movie pixels for display on a screen. A CRT FIFO receives fetches of graphics pixels from a graphics memory and supplies graphics pixels to the pixel mux. A pixel counter counts a number of pixels processed for display on the screen in a current horizontal line and outputs a current pixel count. A pixel compare means receives the current pixel count and a starting pixel address and an ending pixel address of the movie window on the screen. It signals to the pixel mux when to select movie pixels and when to select graphics pixels for display on the screen.

A fetch counter counts a number of fetches of graphics pixels from the graphics memory to the CRT FIFO. The fetch counter counts true fetches wherein graphics pixels are physically written to the CRT FIFO and counts dummy fetches wherein no graphics pixels are physically written to the CRT FIFO. The fetch counter outputs a current fetch count. A first fetch compare means receives the current fetch count and receives the starting pixel address of the movie window converted to fetches. It indicates after a first match is detected that dummy fetches to the CRT FIFO can now be performed rather than only true fetches.

Dummy fetches to the CRT FIFO are performed during the movie window. No graphics pixels are physically fetched from the graphics memory to the CRT FIFO during the dummy fetches. The entire graphics controller is fooled into thinking that actual CRT fetches are occurring.

In further aspects of the invention a movie FIFO receives movie pixels. The movie FIFO supplies movie pixels to the pixel mux. A video fetch compare means receives the current fetch count and receives the ending pixel address of the movie window converted to fetches. It indicates after a movie-end match is detected that dummy fetches to the CRT FIFO can no longer be performed. Thus the end to the dummy fetches is signaled when the movie-end match is detected between the current fetch count and the ending pixel address of the movie window converted to fetches.

In some aspects another requestor is a request to write movie pixels to the movie FIFO. Non-displayed graphics pixels are fetched after the first match and before the movie-end match. The non-displayed pixels are not displayed on the screen but the movie pixels are displayed on the screen in place of the non-displayed graphics pixels.

Other aspects of the invention include a write counter for the CRT FIFO. The write counter indicates a location within the CRT FIFO to write graphics pixels fetched from the graphics memory and is incremented for true fetches and for dummy fetches. Thus the write counter is also incremented for dummy fetches when no graphics pixels are written into the CRT FIFO. A read counter for the CRT FIFO indicates a location within the CRT FIFO to read graphics pixels for transfer to the pixel mux. The read counter is continuously incremented by read requests during a current horizontal line including when the movie pixels are selected by the pixel mux.

BRIEF DESCRIPTION OF THE DRAWINGS

FIG. 4 shows a cathode-ray-tube (CRT) controller sub-system with graphics and video overlay.

DETAILED DESCRIPTION

Figure 1:
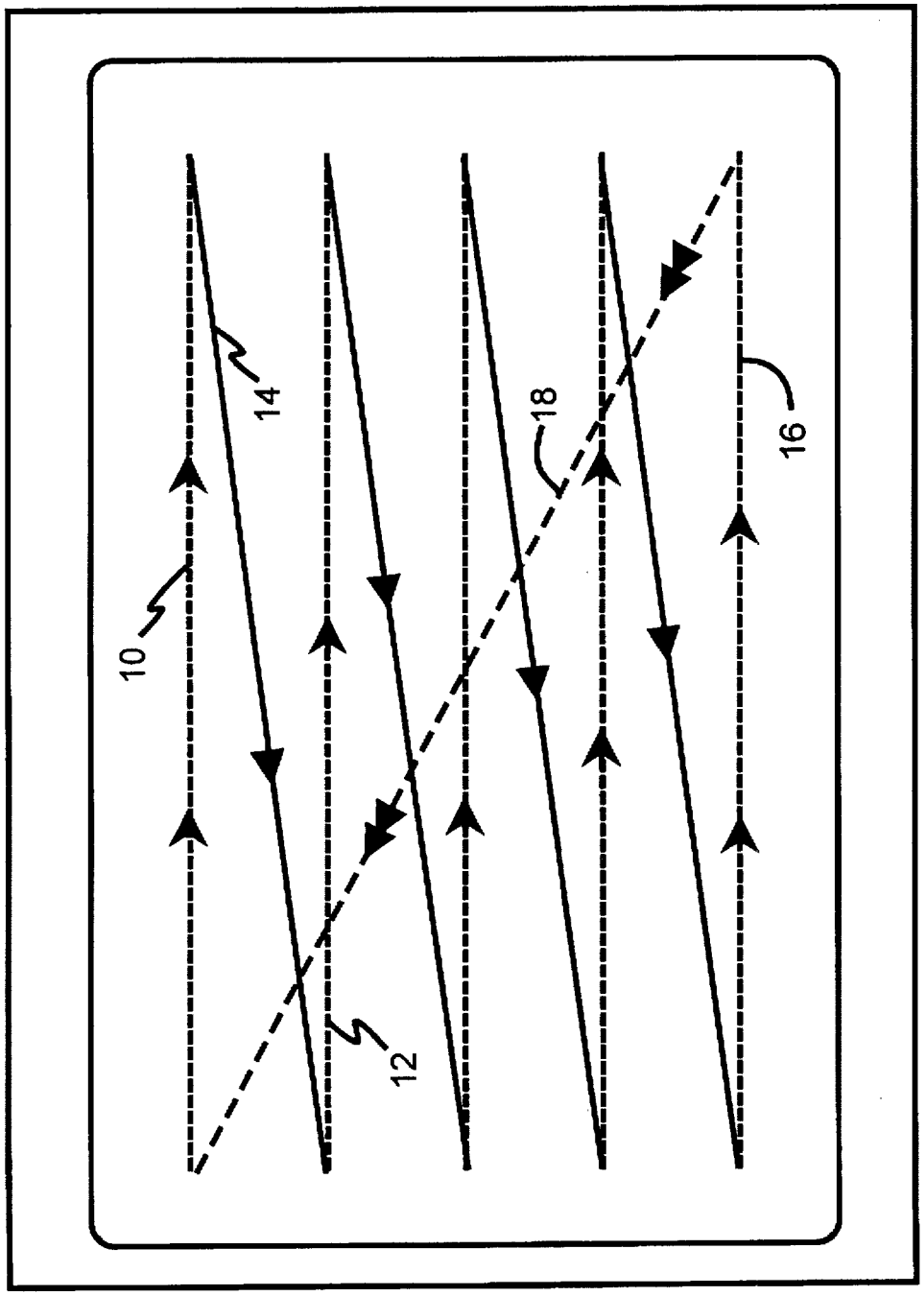
FIG. 1 is a diagram of a display, which could be a cathode-ray-tube (CRT) video display, or a flat-panel liquid-crystal display (LCD) or other type of display.

The present invention relates to an improvement in graphics controllers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

A PIPELINED VIDEO SUB-SYSTEM—FIG. 4

FIG. 4 shows a cathode-ray-tube (CRT) controller sub-system with graphics and movie overlay. A host 50 such as a personal computer processor updates information to be displayed on CRT monitor 62. The update information is written to a host buffer 52 synchronized to a host bus clock. Memory controller 54 receives a request from host buffer 52 when update information has been written by the host. Memory controller 54 transfers the update information from host buffer 52 to graphics memory 56 once the request from the host buffer is granted priority from arbitration with other requesters. An arbitration unit inside the memory controller arbitrates between several requesters desiring access to the graphics memory 56. These requesters produce host requests, display refresh requests, and dynamic-RAM refresh requests to refresh the dynamic memory chips in graphics memory 56. Other requestors include a half-frame buffer, a bit-block transfer (BLT), a GUI accelerator request, hardware cursor, icon support logic, external zoom-video (zv).

Pixel Data Path to Screen

The CRT monitor 62 must be continuously updated or refreshed so that the display information stored in the graphics memory 56 may be visible. Thus a steady stream of display data must be transferred to the CRT from the graphics memory 56, which contains a complete "snapshot" of the information to display. A CRT FIFO 58 is provided to buffer the data that is transferred by memory controller. The data buffered by CRT FIFO 58 is clocked out to attribute controller 61, which may modify the pixel data, perhaps by re-mapping the colors represented or blinking the pixels. Some modes may bypass attribute controller 61.

The modified pixel data is clocked out of attribute controller 61 to RAM 60 by a video clock. RAM 60 contains a RAM that is indexed by the pixel data, and outputs digital values for red, green, and blue sub-pixels that comprise a color pixel. Pixel data leaves RAM 60 and is passed through pixel mux 32 to DAC 65. DAC 65 contains a digital-to-analog converter (DAC) that converts the digital color sub-pixels to analog intensity values that are transmitted to the CRT monitor 62. Either RGB graphics pixels may be converted to analog values by appropriate programming of translation values into RAM 60.

Movie overlay data in YUV format is loaded into movie FIFO 30, and then clocked to scaler 63 which performs scaling and color-space conversion. Pixel mux 32 then selects either movie overlay data from the movie path or graphics pixels from attribute controller 61. DAC 65 converts the data into analog format for display by CRT monitor 62.

TWO LEVELS OF COMPARES—PIXELS AND FETCHES

The current pixel being processed must be compared to the boundaries of the movie window to determine when movie pixels rather than graphics pixels should be sent to the screen. Two different types or levels of compares are performed to determine when the movie window is active for different stages in the pipeline. The primary compare is a pixel-address compare before the pixel mux, to select either the pixel stream from the graphics controller or from the movie controller.

Because the graphics and movie paths are pipelined, second compares are also performed at an upstream stage. Near the movie FIFO the width of the movie window is compared to the current count of fetches from movie memory. Also the width of the first graphics region before the movie window is compared to the current fetch count for loading the CRT FIFO, and finally this current fetch count is compared to the total width of the line.

For these second compares, fetches are the unit of comparison, rather than individual pixels. Fetches typically contain several pixels, depending on color depth. For a 128-bit memory fetch, 16-bits per pixel will result in 128 bits/16 bits/pixel=8 pixels per fetch, but 4-bits per pixel results in 128 bits/4 bits/pixel=32 pixels per fetch. The counters in the memory controller keep track of the current fetch count.

PIXEL COMPARES NEAR PIXEL MUX

Figure 5A:
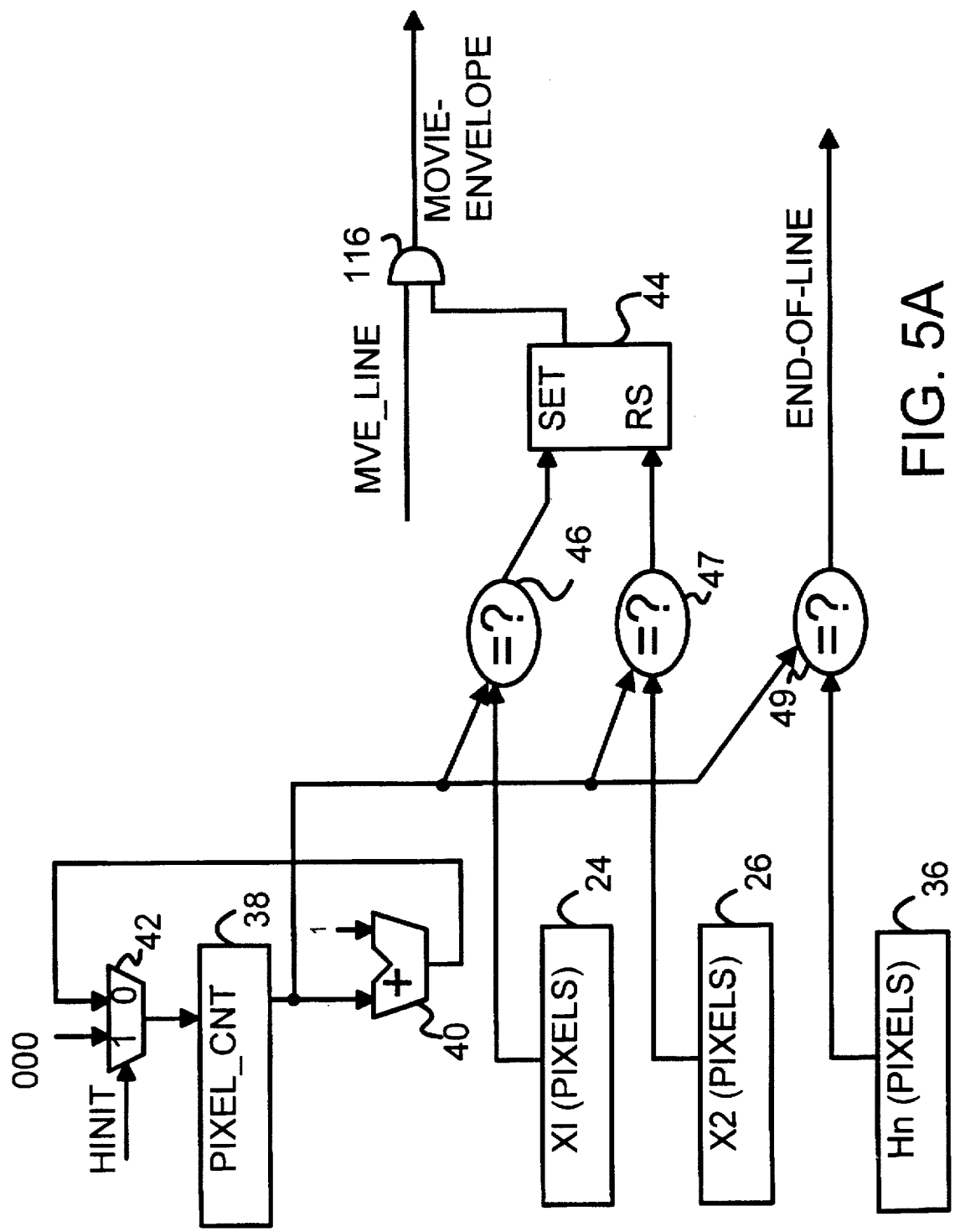
FIG. 5A shows the pixel addresses being compared for control of the pixel mux.

FIG. 5A shows the pixel addresses being compared for control of the pixel mux. The coordinates X1 and X2 define the beginning and end of the movie window for a horizontal line that includes a portion of the movie window. A comparison of the current line number to the line numbers for the top and bottom lines of the movie window determine if the current horizontal line includes a portion of the movie window. A count of the current pixel being processed is kept using register 38 and incrementer 40. The current pixel count can keep track of the current pixel count for a pixel in any stage of the graphics pipeline, but preferably it keeps track of the pixels one stage before the pixel mux, to allow time to switch the mux when a match occurs. Alternately the comparator output itself may be pipelined using well-known techniques.

Register 38 is initialized to zero by mux 42 during the horizontal retrace period, before a new line begins to be written to the screen. The signal HINIT is active then, and may be a derivative to the horizontal sync or horizontal blanking signal. After initialization, as each pixel is written to the new line on the screen, incrementer 40 adds one to the current pixel count in register 38 and writes the incremented count back to register 38. Thus register 38 contains the current pixel count for the line being drawn to the screen.

This current pixel count is compared by comparator 46 to the left boundary of the movie window, X1, which is stored in register 24. When the current pixel count matches X1, the pixel being drawn to the screen is the last pixel in the first graphics region, 1ST GPX of FIGS. 2, and 10. SR flip-flop 44 is set by this detected match from comparator 46. AND gate 116 ensures that the current horizontal line is within the movie window using the logic of FIG. 5B. The movie-envelope signal is driven high to indicate that the pixels now come from the movie FIFO rather than the CRT FIFO. The movie envelope signal is the select signal for the pixel mux.

Figure 2:
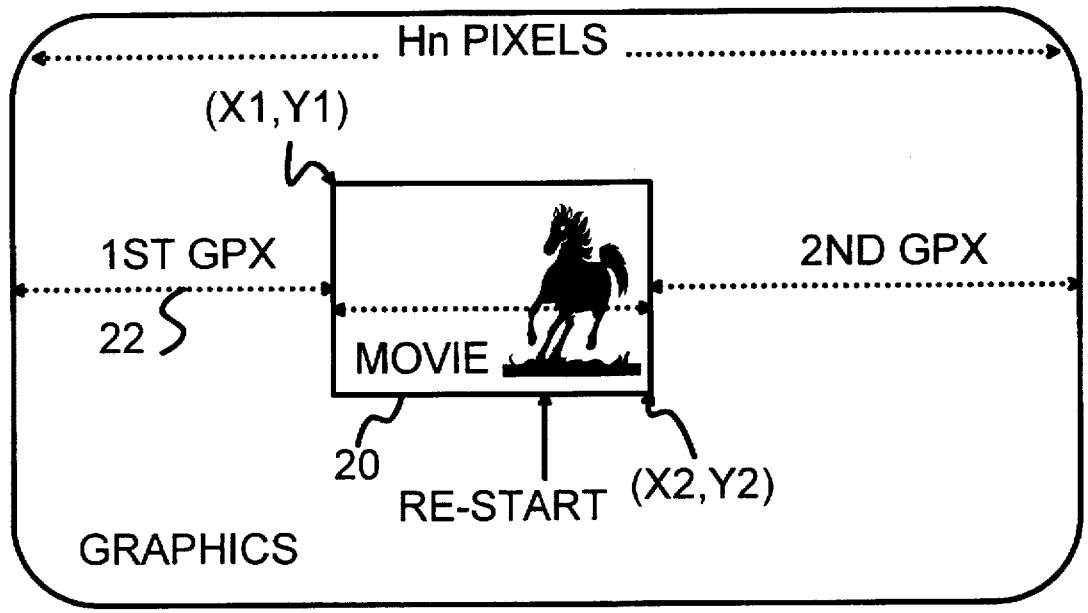
FIG. 2 shows a screen of graphics data overlaid with a movie window.
Figure 3:
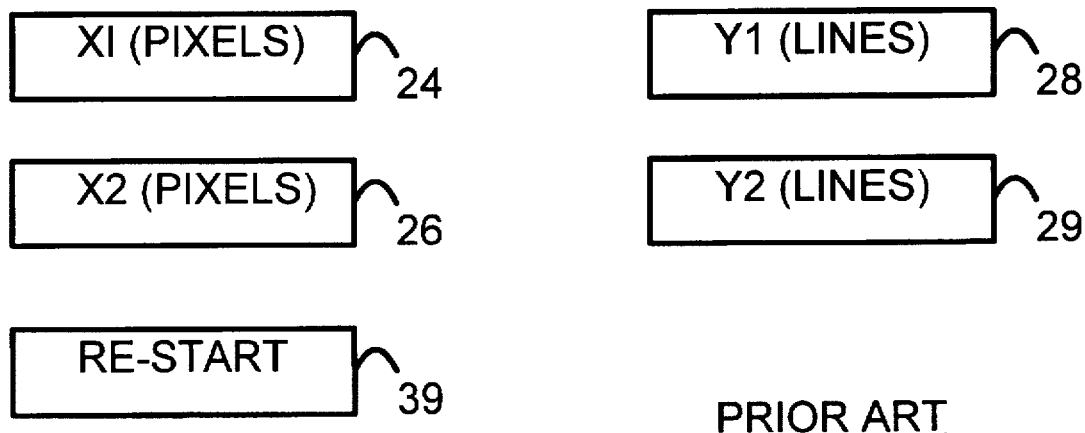
FIG. 3 shows that in addition to video boundary registers for pixels, a re-start register is needed to restart a pipelined graphics controller at the proper time.
Figure 10:
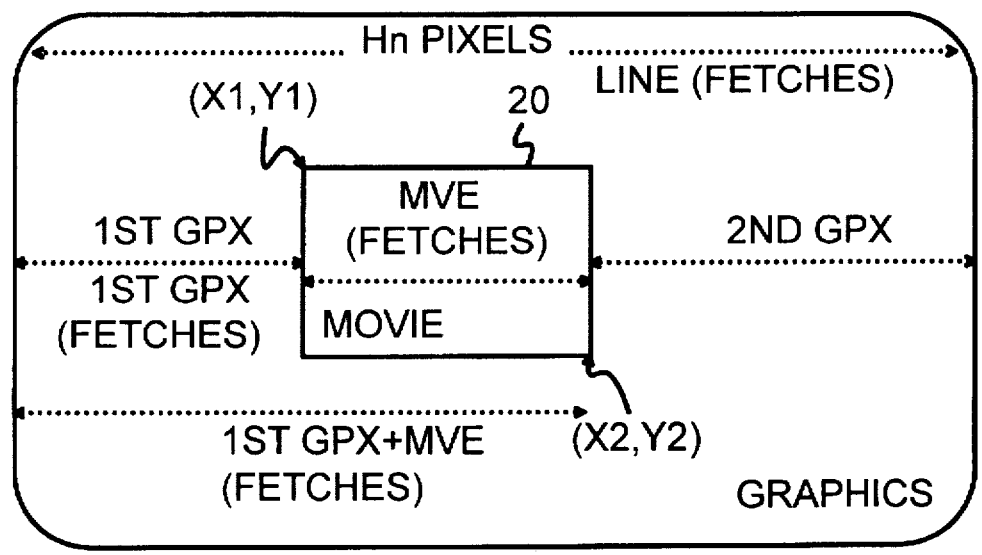
FIG. 10 shows a screen with a video overlay window and the fetch counts that are programmed into registers.

As movie pixels are written to the screen during the movie window, the second region of FIGS. 2, 10, the second boundary of the movie window, X2 from register 26, is compared to the current pixel count from register 38. X2 is larger than X1 when the movie window is present. When comparator 47 detects a match at the end of the movie window, SR flip-flop 44 is cleared and the movie-envelope signal is driven low, causing the pixel mux to now select graphics pixels again. The third region, labeled 2ND GPX on FIGS. 2, 10, is then entered. Graphics pixels are then written to the screen until the current pixel count from register 38 matches the total length in pixels of the line, Hn from register 36. When comparator 49 detects the match at the end of the line, an end-of-line signal is activated, halting the writing of more pixels to the screen past the end of the visible line.

The comparisons of FIG. 5 are all comparisons based on the number of pixels until address X1, X2, or the whole line. The current pixel count from register 38 continues to count during the movie window and is not reset at the end of the movie window. It is only reset at the end of the line. Comparators 46, 47, 49 and registers 24, 26, 38 need to be large enough for the largest line supported. For standard VGA, this is 640 pixels. The three comparators can actually use the same physical hardware as explained later.

Figure 5B:
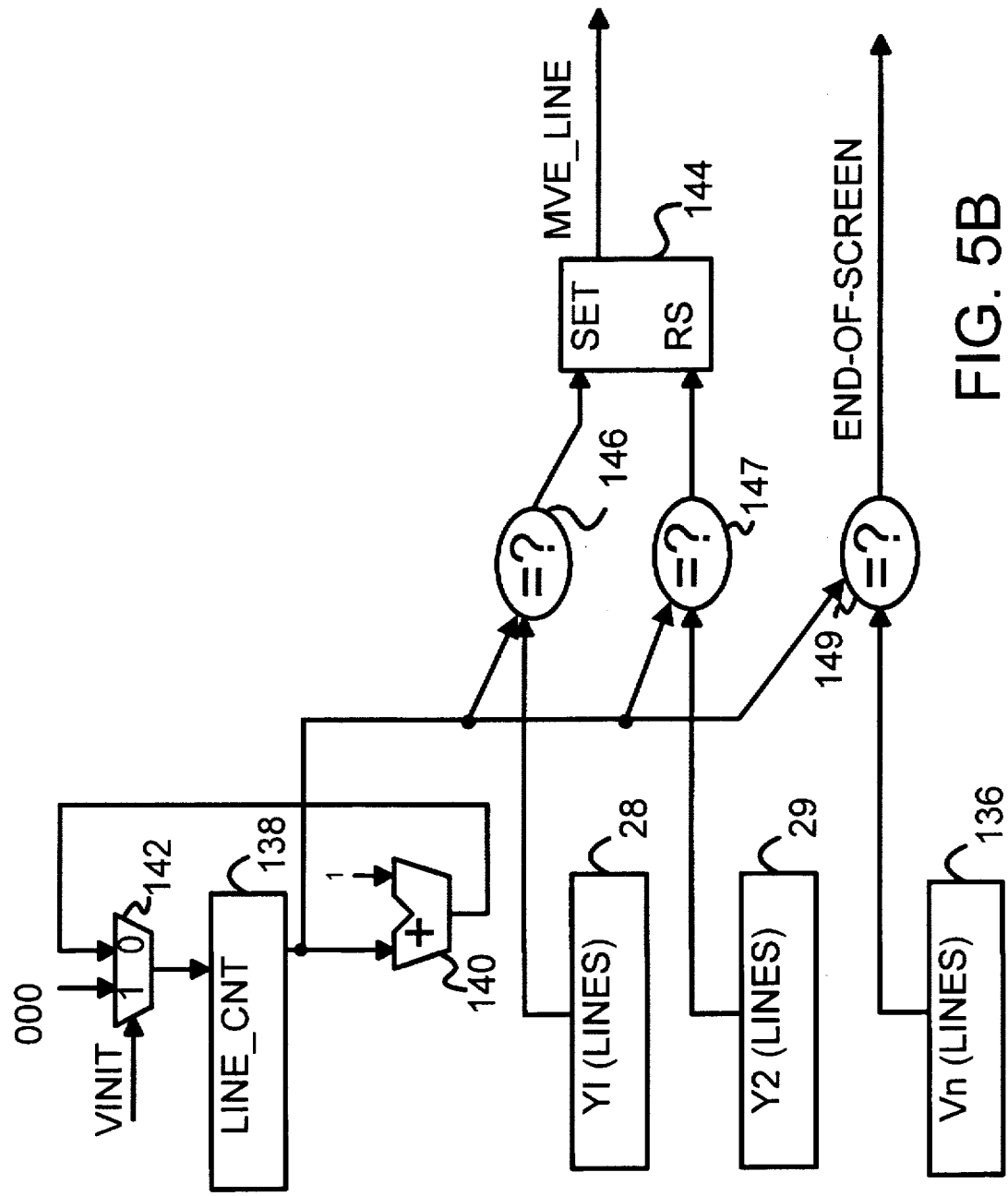
FIG. 5B shows the line numbers being compared for control of the pixel mux.

FIG. 5B shows the line-comparators for determining when a current horizontal line falls within the movie envelope. The line numbers or coordinates Y1 and Y2 define the first and last line of the movie window. A comparison of the current line number of the current line to the line numbers for the top and bottom lines of the movie window determine if the current horizontal line includes a portion of the movie window. A count of the current line being processed is kept using register 138 and incrementer 140.

Register 138 is initialized to zero by mux 142 during the vertical retrace period, before a new screen begins to be written to the screen. The signal VINIT is active then, and may be a derivative to the vertical sync or vertical blanking signal. After initialization, as each line is written to the screen, incrementer 140 adds one to the current line count in register 138 and writes the incremented count back to register 138. Thus register 138 contains the current line number for the line being drawn to the screen.

This current line count is compared by comparator 146 to the upper boundary of the movie window, Y1, which is stored in register 28. When the current line count matches Y1, the line being drawn to the screen is the last line in the upper graphics region, above movie window 20 of FIGS. 2, and 10. SR flip-flop 144 is set by this detected match from comparator 146. The movie-line signal is driven high to indicate that the lines now include pixels which come from the movie FIFO rather than the CRT FIFO.

As lines containing movie pixels are written to the screen during the movie window, the lower boundary of the movie window, Y2 from register 29, is compared to the current line count from register 138. Y2 is larger than Y1 when the movie window is present. When comparator 147 detects a match at the lower line of the movie window, SR flip-flop 144 is cleared and the movie-line signal is driven low, causing the pixel mux to only select graphics pixels again. The region below movie window 20 on FIGS. 2, 10 is then entered. Line with only graphics pixels are written to the screen until the current line pixel count from register 138 matches the total number of line on the screen, Vn from register 136. When comparator 149 detects the match at the end of the screen, an end-of-screen signal is activated and a new vertical re-trace period begins.

FETCH COMPARES NEAR FIFOS—FIG. 6

Figure 6:
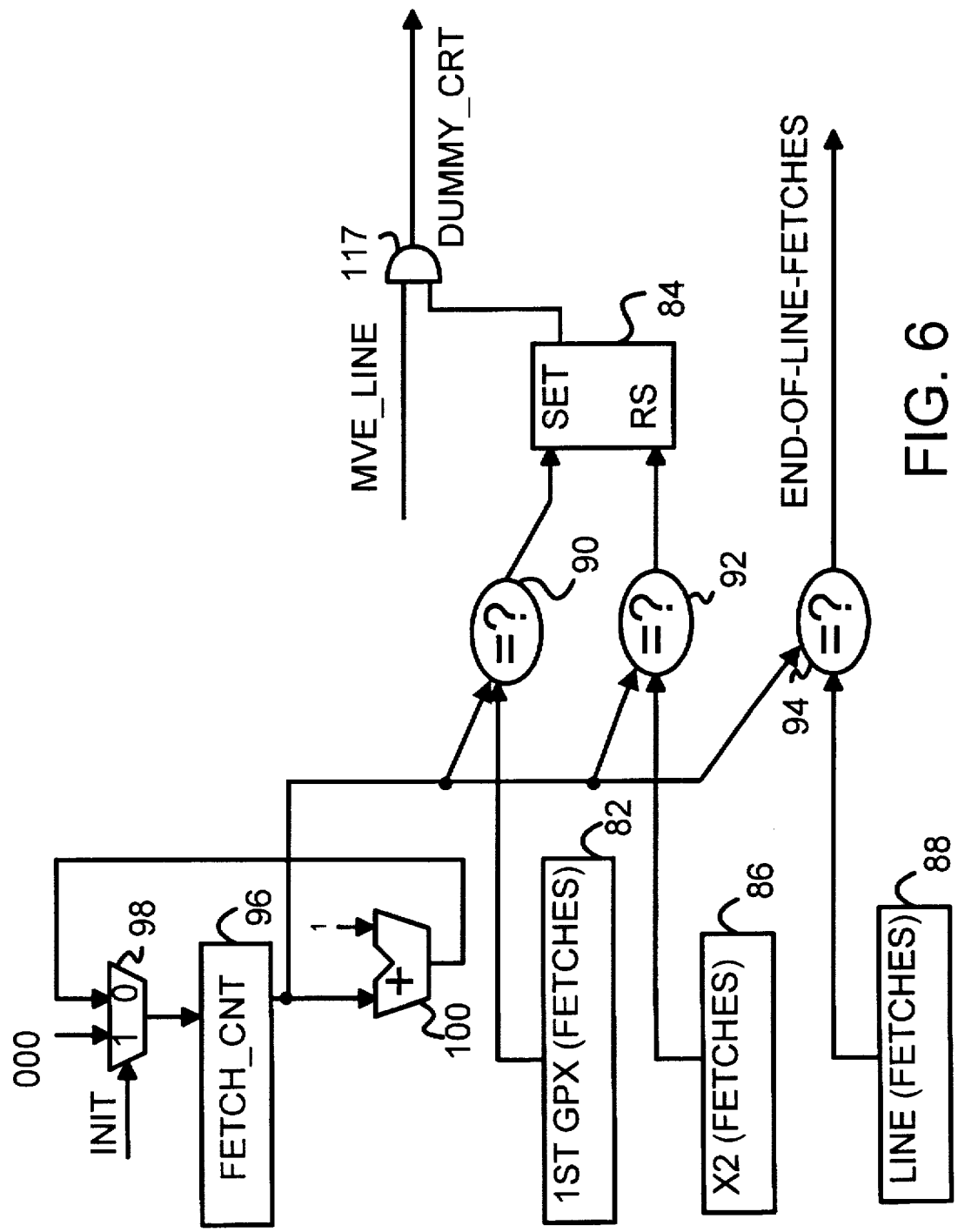
FIG. 6 shows comparisons of the fetch counts from graphics or movie memories to the graphics fetch counter.

FIG. 6 shows comparisons of the fetch counts from graphics memory to the graphics fetch counter. The comparisons of FIG. 6 are performed upstream in the pipelines relative to the pixel mux and the pixel comparisons described for FIG. 5.

The number of fetches from graphics memory is stored in register 96 as the current fetch count. Incrementer 100 increments the current fetch count each time a fetch from graphics memory occurs. Each fetch may contain several pixels. Mux 98 initializes register 96 before the beginning of a new line, such as during the horizontal sync or retrace period.

Each fetch may contain several graphics pixels in RGB format or movie pixels in YUV format such as 4-2-2 or 4-4-4 for Y-U-V. During initialization of new line, before the beginning of the movie window, the CRT and movie FIFO's are loaded during the retrace period. As pixels are read out of these FIFO's, a write request is generated to the memory controller to write more pixels from the graphics memory to these FIFO's. This write request may be generated before the FIFO becomes empty, such as when 2 or more rows in the FIFO are empty.

Movie bits/pixels is preferably the same size as graphics bits/pixels, although in the YUV format. Thus the number of movie pixels written to the screen will be the same as the number of graphics pixels that are hidden. If the CRT and movie FIFO's are constructed with same-sized data paths, then the number of movie fetches equals the number of graphics fetches overlaid. Thus a single fetch counter may be used.

Register 82 is loaded with the number of fetches from graphics memory needed to fetch all the graphics pixels during the first graphics region, 1ST GPX. Register 88 is loaded with the number of fetches needed to fetch all the pixels for a full line. Both registers 82, 88 are loaded with the number of fetches, which is a number of pixels divided by the number of pixels retrieved in each memory access. The result is rounded up if necessary to ensure that all pixels are retrieved. Shifter hardware calculates the number of fetches from the number of pixels and the graphics mode for loading into registers 82, 88, which vary for different resolutions an color depths. The value in register 82 also varies with the placement on the screen of the movie window.

Register 86 is loaded with the sum of the width of the movie window and the first graphics region, 1ST GPX, expressed in fetches.

Operation of Fetch Counters and Comparators

At the beginning of a new horizontal line, register 96 is cleared. As the CRT FIFO is loaded from the graphics memory, each fetch cycle increments the current fetch count in register 96. The current fetch count is compared by comparator 90 to the width of the first graphics region, 1ST GPX of FIG. 10, and when a match occurs SR flip-flip 84 is set, activating the dummy_CRT signal through AND gate 117 when a vertical line match is also detected by the line comparator of FIG. 5B. At this point, enough pixels have been fetched into the CRT FIFO to reach pixel X1, the last graphics pixel before the movie window.

Movie fetches occur during the horizontal retrace period to fill the movie FIFO. Once the movie FIFO is full, these fetches stop until some movie pixels are read out of the movie FIFO. The current count in register 96 is incremented for each dummy CRT fetch, which can occur at the same time as these movie fetches. As the movie window starts after pixel X1, the fetch count continues to increment from dummy CRT fetches until the full width of movie pixels have been loaded into the movie FIFO. At this point a match is signaled by comparator 92 between the current fetch count from register 96 and the width of the movie window and 1ST GPX region in register 86. This match indicates that graphics pixels should now be fetched for the second graphics region, 2ND GPX. The last few movie pixels continue to be written to the screen through the various pipeline stages. Especially when the movie FIFO is large, the match from comparator 92 is signaled many cycles before the last movie pixel is drawn to the screen.

The match from comparator 92 resets SR flip-flop 84, turning off the dummy_CRT signal. This dummy_CRT signal indicates when dummy fetches to the CRT FIFO are performed. Dummy fetches are fetches corresponding to graphics pixels that are not displayed. Since these fetch contain non-displayed pixels, they are not needed except to keep the fetch count in register 96 counting even during the movie window and to update the CRT FIFO's read and write pointers. Other arbiters are given priority during dummy_CRT cycles as explained for FIG. 7.

Finally as regular, non-dummy_CRT graphics fetches continue after the movie-end match is signaled by comparator 92, the total graphics fetches in the horizontal line, stored in register 88, is compared by comparator 94 to the current fetch count from register 96. A match signals that all the pixels in the horizontal line have been fetched from graphics memory, though they have not all yet been written to the screen. The end-of-line-fetches signal from comparator 94 causes graphics fetching to cease for this line. Thus unused pixels past the end of the line are not fetched, reducing the bandwidth used by fetches to the CRT FIFO.

HOST WINS ARBITRATION DURING DUMMY CYCLES—FIG. 7

Figure 7:
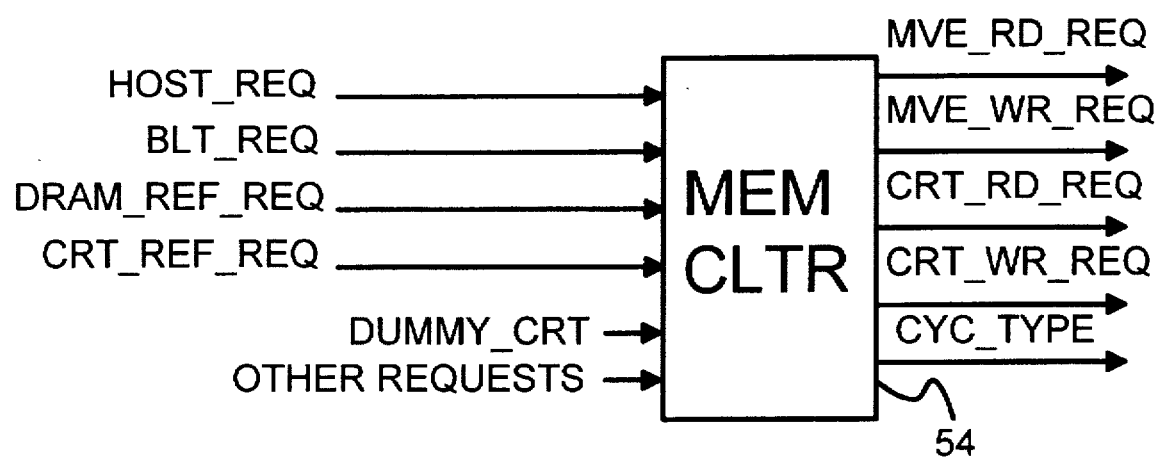
FIG. 7 shows the arbitration for the graphics memory that favors external sources during dummy_CRT cycles which occur during the movie window.

FIG. 7 shows the arbitration for the graphics memory that favors sources other than CRT screen refresh during dummy_CRT cycles which occur during the movie window. Arbitration logic selects one of the requesting sources as the winner and outputs this cycle type as CYC_TYPE. Normally, requests for filling the CRT FIFO using graphics memory fetches has a very high priority, since not performing these fetches could result in pixels not being written to the screen at the proper time. However, during dummy_CRT cycles when the movie window is active, the graphics pixels are not really needed. So the other arbitration sources win the arbitration over dummy cycles, but dummy CRT cycles are issued in parallel. If there are no other requesters other than dummy fetch cycles, then these dummy fetch cycles still occur. However, when the host, BLT engine, or DRAM refresh request access of the graphics memory when the dummy_CRT signal is active, then these other requesters win the arbitration along with dummy CRT cycles.

Read and write control signals are generated by memory controller 54 for both the movie and CRT FIFO. Dummy CRT cycles activate the CRT FIFO read and write request signals to keep incrementing the CRT FIFO and to continue to shift non-displayed pixels out of the CRT FIFO.

GRAPHICS COUNTERS STILL INCREMENTED FOR DUMMY CYCLES DURING MOVIE WINDOW

The counters for the CRT FIFO are still incremented for dummy cycles. Thus when a host cycle is using the graphics memory and no pixel data is actually fetched to the CRT FIFO, the CRT FIFO still increments its counters as if a true fetch had occurred, even though invalid pixel data was written in. Since the pixel data during dummy cycles are not displayed, but covered by the movie window, the actual data is not relevant. Since the fetch counters of FIG. 6 are also incremented for each fetch, including dummy fetches, these counters are used to count the fetches to the end of the horizontal line, just as if no full-motion video were displayed. The graphics pixels in the CRT FIFO can also continue to be read and passed down the graphics pipeline, but are blocked at the pixel mux where they are simply overwritten by the next pixel until the mux switches to graphics pixels when the X2 pixel match is signaled. Thus the graphics pixels are always ready for an immediate pixel mux switch with no delay to re-start the graphics pixel pipeline.

Figure 8:
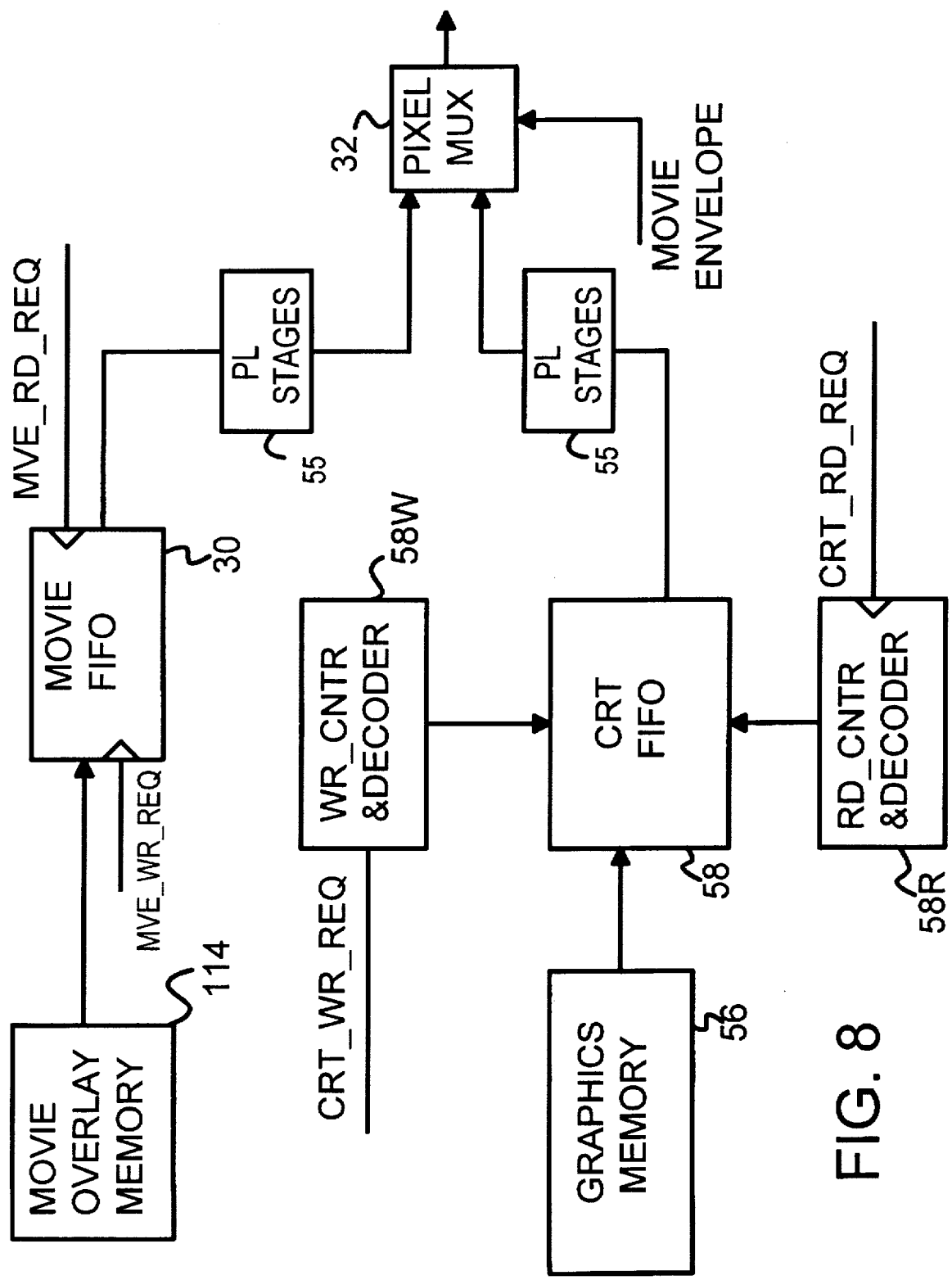
FIG. 8 shows the CRT FIFO read and write pointers that are incremented even during dummy cycles.

FIG. 8 shows the CRT FIFO read and write pointers that are incremented even during dummy cycles. Pixel mux 32 selects movie pixels from the movie path when its select signal, movie envelope from FIG. 5, is active. Pixel mux 32 selects graphics pixels from the CRT path when movie envelope is inactive. The movie read request signal MVE_RD_REQ from memory controller 54 is sent to movie FIFO 30 to clock pixels out during the movie window but not otherwise. This keeps the movie FIFO from losing pixel data before or after the movie window. Read counter and decoder 58R of CRT FIFO 58 receives the CRT read request signal CRT_RD_REQ from memory controller 54 to clock pixels out of the CRT FIFO, even during dummy cycles. The background pixels during dummy cycles are not displayed but are covered up by the movie overlay.

Movie FIFO 30 receives movie pixels from movie overlay memory 114, which may not be a real memory at all, but can be an active video source such as a TV scan or a video camera output stream that is properly synchronized. Movie overlay memory 114 may also be from the same DRAM or VRAM memory chip also used for graphics memory 56.

Graphics pixels are read from graphics memory 56 and written to CRT FIFO 58 during CRT fetches. During dummy fetches pixel data is not read from graphics memory 56 since graphics memory 56 is in use by another requestor such as the host or movie FIFO 30 when movie overlay memory 114 shares the same memory chip as graphics memory 56. However, write counter and decoder 58W is still incremented for all dummy cycles, since the CRT write request signal CRT_WR_REQ from memory controller 54 is generated when another requester wins arbitration and executes a cycle when dummy_CRT is active. Normal CRT FIFO fills activate CRT_WR_REQ which also increments write counter and decoder 58W. As pixels are shifted out of CRT FIFO 58, even during dummy CRT cycles, CRT_WR_REQ and CRT_RD_REQ continue to be generated for dummy cycles during the move envelope.

Additional pipeline stages 55 are present between movie FIFO 30 and pixel mux 32, and between CRT FIFO 58 and pixel mux 32. Pipeline stages 55 may include an attribute controller, color-space converter or other logic.

LCD AND CRT CONTROLLER—FIG. 9

Figure 9:
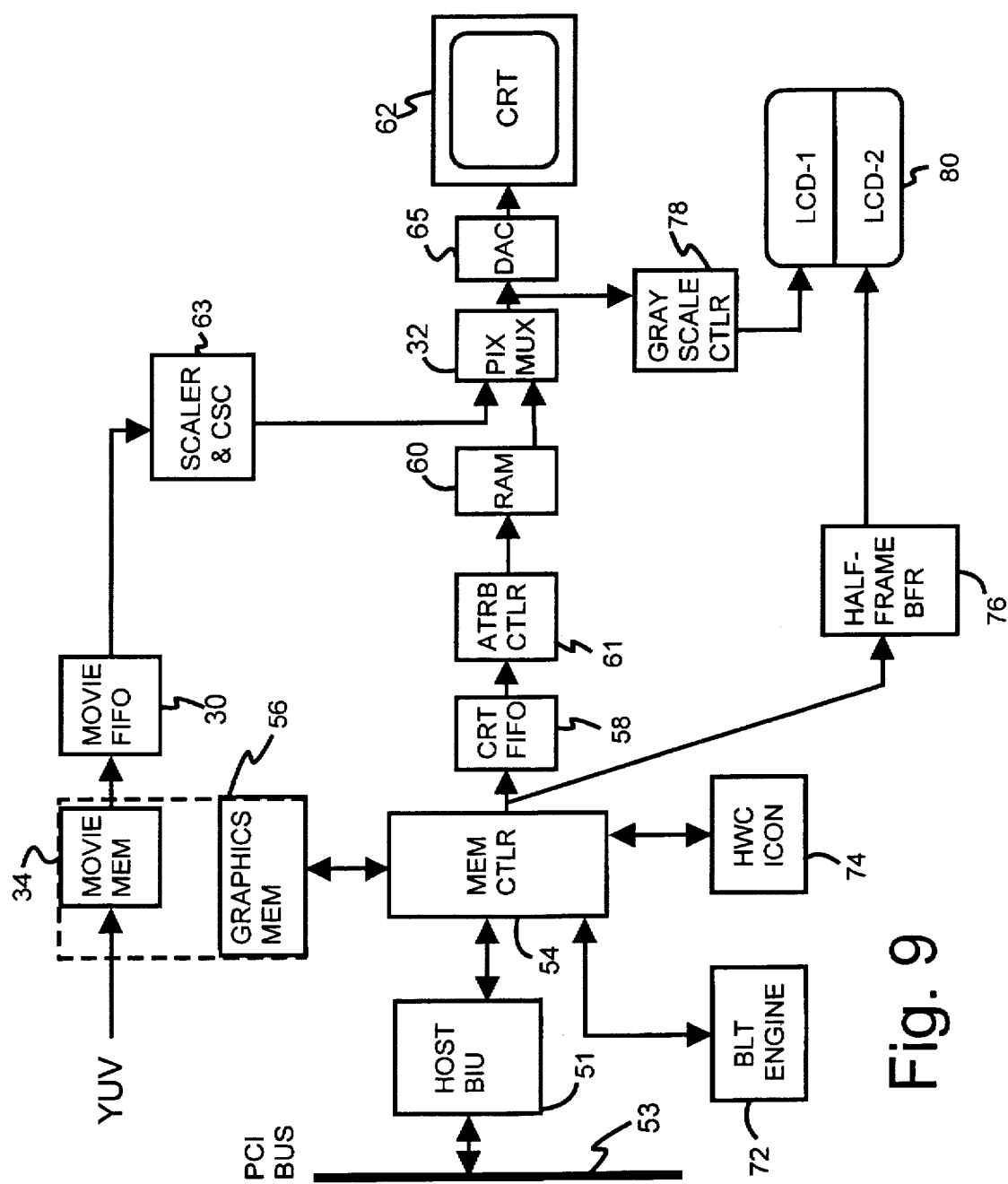
FIG. 9 shows a block diagram of a video sub-system driving a CRT and an LCD.

FIG. 9 shows a block diagram of a video sub-system driving a CRT and an LCD. A host bus such as a PCI bus 53 on the host transfers data to and from memory controller 54 with the aid of host bus-interface unit 51. PCI bus 53 is an industry-standard interface bus defined by a consortium of personal computer manufacturers.

Memory controller 54 uses memory clock to transfer host data. Graphics memory 56 may require periodic refreshing to prevent data loss from leakage in the dynamic memory chips in graphics memory 56. Block transfers and manipulation of the video data in graphics memory 56 may be accomplished by BLT engine 72, which itself operates using the memory clock. A hardware cursor and icon-drawing logic is provided by HWC logic 74. Memory controller 54 transfers video data to and from HWC logic 74 and graphics memory 56.

Memory controller 54 also writes pixel data from graphics memory 56 to CRT FIFO 58 for refreshing CRT monitor 62 and/or LCD screen 80. Data may also be written to half-frame buffer 76, which buffers half of the screen when a dual-scan LCD screen is used.

Pixel data is transferred from CRT FIFO 58 to attribute controller 61 using the video clock. Attribute controller 61 may re-map or alter the color represented by the pixel data by using a color look-up table. Other attributes, such as blinking or reverse-video characters may be applied by attribute controller 61.

RAM 60 receives the modified pixel data from attribute controller 61. RAM 60 contains a RAM that is indexed by the pixel data, and outputs digital values for red, green, and blue sub-pixels that comprise a color pixel. Pixel mux 32 selects graphics pixels from RAM 60 or scaled movie pixels from scaler 63 for output to DAC 65. DAC 65 contains a digital-to-analog converter (DAC) that converts the digital color sub-pixels to analog intensity values that are transmitted to the CRT monitor 62. The video clock is used to create the analog output to CRT monitor 62 by timing the transfer of the analog pixel intensity data outputted.

Digital pixel data from pixel mux 32 is clocked to Gray-scale controller 78 by panel clock PCLK. The digital pixel data is taken from pixel mux 32 after RAM 60 has been accessed and has output the digital sub-pixels, but before conversion to analog values by DAC 65. Gray-scale controller 78 may perform a gray-scale conversion of the color sub-pixels if LCD screen 80 is monochrome or color, or may perform some other conversion or dithering of the pixel data to a format accepted by LCD screen 80. The converted pixel data from Gray-scale controller 78 is clocked into the LCD screen 80 using the direct panel clock, $PCLK_D$. LCD screen 80 may itself include some additional control or conversion logic to manipulate the pixel data before its is visually displayed on a screen, and it may be of many different types or technologies. When the LCD screen is of the dual-panel type, pixel data is also supplied by an indirect path from half-frame buffer 76, being clocked in by indirect panel clock $PCLK_I$.

Movie data in YUV format is loaded from movie overlay memory 34 into movie FIFO 30, and then clocked by the movie clock to color-space converter and scaler 63 and then to pixel mux 32, which selects either movie overlay data from movie FIFO 30 and scaler 63 or graphics pixels from attribute controller 61 and RAM 60. DAC 65 then converts the YUV pixels into analog voltages.

Movie overlay memory 34 can be constructed from the same memory chips as graphics memory 56. Memory controller 54 can then transfer movie pixels from movie overlay memory 34 to movie FIFO 30 without the need of a separate movie controller.

Programming Registers for Movie Overlay Operation

FIG. 10 shows a screen with a movie overlay window 20 and the fetch counts that are loaded into registers by shifting logic. The shifting logic can be constructed from barrel shifters or rotators which perform a binary divide operation. For example, a shift by three binary bit-positions performs a divide by 8. The divisor is determined by the color depth (size of each pixel) and the width of the graphics memory. Register 82 of FIG. 6 is loaded by the shifting logic with the number of graphics memory fetches needed to read the pixels from the start of the horizontal line until the beginning of the movie window 20. This is the first graphics region labeled 1ST GPX. Register 88 is loaded with the total number of graphics fetches to retrieve all the pixels in any horizontal line, including those lines outside of movie window 20. This register is thus loaded with Hn pixels divided by the number of pixels per fetch. Register 86 is loaded with the movie window and first graphics window widths in fetches, X2(FETCHES). This is simply the value X2 converted to fetches.

As a horizontal line is scanned from left to right and pixels are drawn to the screen, register 96 keeps incrementing to keep track of the total number of fetches from graphics memory, including dummy fetches.

The pixel addresses X1 and X2 must also be stored in registers for the pixel compare of FIG. 5, which controls the pixel mux at the end of the pipeline. These pixels addresses X1, X2 are converted to fetches by the shifting logic and then the result loaded into the fetch registers. The fetch registers are preferably re-loaded during each vertical blanking period for the next screen. Thus an offset or re-start address does not have to be stored.

ADVANTAGES OF THE INVENTION

The bandwidth used for refreshing the CRT FIFO is reduced by not fetching un-displayed pixels during dummy cycles when another requester arbitrates for the graphics memory. Since the other requesters always win arbitration over CRT FIFO fill requests during dummy cycles when the pixels fetched would not be displayed anyway, the latency for these requestors is also reduced. Power can also be reduced since additional pixels during the movie window and beyond the end of the horizontal line are not fetched.

Both bandwidth and power consumption are kept at their minimum since exactly the number of pixels required for display are fetched and no more. Dummy fetches are fetches of graphics pixels that are not displayed. Since these fetch contain non-displayed pixels, they are not needed except to keep the fetch count in register 96 counting even during the movie window. The CRT FIFO request is taken out of arbitration and other requesters are given priority during dummy_CRT cycles. Thus fetches to fill the CRT FIFO with pixels underneath the video overlay which are not displayed are transparently blocked by activating the dummy_CRT signal, allowing other requesters to have full access to the graphics memory.

ALTERNATE EMBODIMENTS

Several other embodiments are contemplated by the inventor. For example the various blocks of the video sub-system may be integrated onto one or more silicon substrates, depending upon the technology used. The invention has been described in terms of a combined CRT and LCD controller, but the invention could apply to desktop computers with only CRT that are designed to be energy-efficient. The invention could also be used for LCD-only systems. A full-frame buffer may be used rather than a half-frame buffer, and the gray-scale controller may be deleted so that the graphics controller drives the LCD screen directly. This is often true for thin-film-transistor (TFT) display screens.

The movie window, sometimes known as full-motion video, may actually be a relatively static image such as images from a slide show. However, the pixel data for the movie window is in YUV format rather than RGB format, as is thus stored separately from the RGB graphics data, either in a separate memory, or in a separate part of the frame buffer memory. Two or more movie windows may be separately overlaid onto the graphics data by additional logic, or preferably re-use of the existing logic. The YUV movie data may also be stored as part of the graphics data.

The compares described herein may also be pipelined to determine matches a cycle or two before action is required. Flip-flop storage elements may be added to delay signals in the pipelines. The pixel addresses X1 and X2 can be converted to fetches by the programmer, or in software or conversion logic may be added to the controller.

The comparators described herein are preferably combined into a single fetch comparator and a single pixel comparator. The three registers are simply muxed to the single comparator during each of the three regions, and a transition to another region, signaled by a match, simply changes the mux controls to select the next register. Line compares may be performed to either include or exclude the top and bottom lines of the movie window.

Another alternate embodiment is to use pixel counters that are character counters. A character is typically 8 pixels, so a character counter is simply a divided-down pixel counter.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A pipelined graphics controller for overlaying a movie window over a graphics screen, the pipelined graphics controller comprising:

a pixel mux for selecting graphics pixels or movie pixels for display on a screen;

a CRT FIFO, for receiving fetches of graphics pixels from a graphics memory, the CRT FIFO supplying graphics pixels to the pixel mux;

a pixel counter for counting a number of pixels processed for display on the screen in a current horizontal line, the pixel counter outputting a current pixel count;

pixel compare means, receiving the current pixel count and a starting pixel address and an ending pixel address of the movie window on the screen, for signaling to the pixel mux when to select movie pixels and when to select graphics pixels for display on the screen;

a fetch counter for counting a number of fetches of graphics pixels from the graphics memory to the CRT FIFO, the fetch counter counting true fetches wherein valid graphics pixels are physically written to the CRT FIFO and counting dummy fetches wherein no valid graphics pixels are physically written to the CRT FIFO, the fetch counter outputting a current fetch count;

first fetch compare means, receiving the current fetch count and receiving the starting pixel address of the movie window converted to fetches, for indicating after a first match is detected that dummy fetches to the CRT FIFO can now be performed rather than only true fetches;

whereby dummy fetches to the CRT FIFO are performed for the movie window, wherein no graphics pixels are physically fetched from the graphics memory to the CRT FIFO during the dummy fetches.

2. The pipelined graphics controller of claim 1 wherein dummy fetches are performed when another requester arbitrates control of the graphics memory after the first fetch compare means detects the first match.

3. The pipelined graphics controller of claim 2 wherein another requester is selected from the group consisting of a host requesting to write to the graphics memory, a host requesting to read from the graphics memory, a BLT transfer request, a half-frame buffer request, and an external video port request.

4. The pipelined graphics controller of claim 1 further comprising:

a movie FIFO, receiving movie pixels, for supplying movie pixels to the pixel mux;

video fetch compare means, receiving the current fetch count and receiving the ending pixel address of the movie window converted to fetches, for indicating after a movie-end match is detected that dummy fetches to the CRT FIFO can no longer be performed rather than only true fetches;

whereby the end to the dummy fetches is signaled when the movie-end match is detected between the current fetch count and the ending pixel address of the movie window converted to fetches.

5. The pipelined graphics controller of claim 4 wherein another requestor is a request to write movie pixels to the movie FIFO.

6. The pipelined graphics controller of claim 4 wherein movie fetches comprise a same number of movie pixels as a number of graphics pixels in each true fetch to the CRT FIFO.

7. The pipelined graphics controller of claim 4 wherein non-displayed graphics pixels fetched after the first match and before the movie-end match are not displayed on the screen but movie pixels are displayed on the screen in place of the non-displayed graphics pixels.

8. The pipelined graphics controller of claim 7 further comprising:

a write counter for the CRT FIFO, the write counter indicating a location within the CRT FIFO to write graphics pixels fetched from the graphics memory, the write counter incremented for true fetches and for dummy fetches, whereby the write counter is also incremented for dummy fetches when no graphics pixels are written into the CRT FIFO.

9. The pipelined graphics controller of claim 8 further comprising:

a read counter for the CRT FIFO, the read counter indicating a location within the CRT FIFO to read graphics pixels for transfer to the pixel mux, the read counter continuously incremented by read requests during a current horizontal line including when the movie pixels are selected by the pixel mux, whereby the read counter is also incremented for non-displaying graphics pixels that are replaced by the movie pixels by the pixel mux for display to the screen.

10. The pipelined graphics controller of claim 1 further comprising:

line fetch compare means, receiving the current fetch count and receiving a line fetch count, the line fetch count being a total number of fetches from graphics memory to fetch all pixels in a horizontal line without a movie window, for signaling an end to fetching pixels for a current horizontal line when a match is detected.

11. The pipelined graphics controller of claim 10 wherein fetches for the current horizontal line from the graphics memory to the CRT FIFO cease after the line fetch compare means signals the end to fetching pixels for the current horizontal line.

12. The pipelined graphics controller of claim 4 further comprising:

line fetch compare means, receiving the current fetch count and receiving a line fetch count, the line fetch count being a total number of fetches from graphics memory to fetch all pixels in a horizontal line without a movie window, for signaling an end to fetching pixels for a current horizontal line when a match is detected.

13. The pipelined graphics controller of claim 12 wherein the first fetch compare means and the line fetch compare means include sharing means for sharing a same comparator.

14. The pipelined graphics controller of claim 13 wherein the sharing means for sharing the same comparator comprises multiplexors and select logic to select either the starting pixel address of the movie window converted to fetches, or the line fetch count, to compare to the current fetch count by the same comparator.

15. A method of overlaying a full-motion-video envelope onto a graphics display comprising repeating the following steps for a current horizontal line for all lines in the graphics display:

for a current horizontal line, comparing a top line number and a bottom line number for top and a bottom boundary of the full-motion-video envelope to a current line number of the current horizontal line (a) when the current line number is not between the top line number and the bottom line number:
fetching graphics pixels from a graphics memory to a CRT FIFO;
incrementing a current fetch count for each fetch of graphics pixels from the graphics memory;
comparing the current fetch count to a total fetch count for a horizontal line, the total fetch count being a total number of fetches from the graphics memory to fetch all graphics pixels for the current horizontal line;
signaling an end of fetching for the current horizontal line and stopping fetching from the graphics memory for graphics pixels in the current horizontal line when the current fetch count matches the total fetch count;
transferring fetched graphics pixels to a display screen;

(b) when the current line number is between the top line number and the bottom line number, then the current horizontal line is comprised of a first graphics region followed by a movie region followed by a second graphics region:
fetching graphics pixels from the graphics memory to the CRT FIFO;
incrementing the current fetch count for each fetch of graphics pixels from the graphics memory;
comparing the current fetch count to a first fetch count for the first graphics region of the horizontal line, the first fetch count being a total number of fetches from the graphics memory to fetch all graphics pixels for the first graphics region of the current horizontal line;
signaling the start of dummy fetches, whereby dummy fetches to the CRT FIFO are performed when no graphics pixels are physically fetched from the graphics memory to the CRT FIFO, when the current fetch count matches the first fetch count;
transferring the fetched graphics pixels for the first graphics region to the display screen;
fetching movie pixels to a movie FIFO;
transferring the fetched movie pixels for the movie region to the display screen;
incrementing the current fetch count during dummy fetches when movie pixels are fetched to the movie FIFO;
comparing the current fetch count to a second fetch count, the second fetch count being a sum of a width of the first graphics region and a width of the movie region of the current horizontal line converted to fetches;
signaling the end of movie fetches and stopping movie fetches for the current horizontal line and signaling the end of dummy fetches when the current fetch count matches the second fetch count;
performing dummy fetches from the graphics memory to the CRT FIFO after the start of dummy fetches is signaled and before the end of dummy fetches is signaled;
fetching graphics pixels from the graphics memory to a CRT FIFO after the end of dummy fetches is signaled;
incrementing the current fetch count for each fetch of graphics pixels from the graphics memory after the end of dummy fetches is signaled;
comparing the current fetch count to the total fetch count for the horizontal line, the total fetch count being a total number of fetches from the graphics memory to fetch all graphics pixels for the current horizontal line;
signaling an end of fetching for the current horizontal line and stopping fetching from the graphics memory for graphics pixels in the current horizontal line when the current fetch count matches the total fetch count;
transferring the fetched graphics pixels for the second graphics region to the display screen, whereby full-motion video is overlaid on the graphics display but the fetching for the CRT FIFO continues using dummy fetches during the movie region.

16. The method of claim 15 further comprising the steps of:

arbitrating for access to the graphics memory when a requestor requests access to the graphics memory, the requester being a host processor updating or reading the graphics pixels in the graphics memory or the requestor being for the fetching of movie pixels to the movie FIFO; and granting access to the requester and not to the CRT FIFO for a simultaneous screen-refresh request from the CRT FIFO after the start of dummy fetches is signaled and before the end of dummy fetches is signaled but granting access to the CRT FIFO when dummy fetches is not signaled, whereby requesters win arbitration during dummy fetches.

17. The method of claim 16 wherein transfer of graphics pixels to the graphics screen occurs in parallel to fetching of graphics pixels, but staggered by a pipeline delay.

18. A graphics controller comprising:

a pixel mux for selecting either graphics pixels or movie pixels for display to a screen;

a pixel comparator for comparing a horizontal address of a current pixel to a starting and an ending pixel address of a movie window, the pixel mux selecting the movie pixels for display when the horizontal address of the current pixel is between the starting and the ending pixel address;

a CRT FIFO for buffering graphics pixels from a graphics memory to the pixel mux;

a fetch comparator for comparing (a) a current fetch address to a starting movie fetch address, the starting movie fetch address being the starting pixel address divided by a number of pixels fetched from the graphics memory for each fetch cycle, the fetch comparator also for comparing (b) the current fetch address to an ending fetch address for a horizontal line, the ending fetch address being an address of the last graphics pixel at the edge of the screen, the fetch comparator also for comparing (c) the current fetch address to a final movie fetch address, the final movie fetch address being the ending address of the movie window divided by the number of pixels fetched from the graphics memory for each fetch cycle;

a dummy fetch indicator, being activated by the fetch comparator when the current fetch address matches the starting movie fetch address, the dummy fetch indicator being de-activated when the current fetch address matches the final movie fetch address;

a dummy fetch generator, responsive to the dummy fetch indicator, for generating a dummy fetch, the dummy fetch being a fetch wherein no graphics pixels which are displayed are physically written to the CRT FIFO, but the current fetch address is advanced without the CRT FIFO receiving graphics pixels in the dummy fetch; and an arbiter, coupled to a requester, for arbitrating access to the graphics memory, the arbiter granting higher priority to the requester than to the CRT FIFO when the dummy fetch indicator is activated, whereby the CRT FIFO continues to advance during movie fetches but allows the host processor to access the graphics memory using a dummy fetch that also advances the CRT FIFO.

19. The graphics controller of claim 18 wherein the requestor is the host processor or a movie request.

20. The graphics controller of claim 18 wherein the CRT FIFO requests fetches from the graphics memory during display of movie pixels as well as during display of graphics pixels, the dummy fetches occurring when the movie fetches occur for fetching movie pixels for display.

21. The graphics controller of claim 20 further comprising:

a DAC, coupled to receive graphics pixels and movie pixels from the pixel mux, for converting the movie pixels and the graphics pixels to analog voltages for output to the screen.

22. The graphics controller of claim 21 further comprising:

a half-frame buffer for buffering pixels for half of the screen, the half-frame buffer coupled to half of a flat-panel screen.

23. The graphics controller of claim 21 further comprising:

a full-frame buffer for buffering pixels for the screen, the full-frame buffer coupled to a flat-panel screen.

24. The graphics controller of claim 21 further comprising:

a gray-scale controller, coupled to receive pixels from the pixel mux, for converting pixels to a format used by a flat-panel display screen, the gray-scale controller outputting converted pixels to the flat-panel display screen.

* * * * *